(12) United States Patent
Toscano

(10) Patent No.: US 11,533,404 B1
(45) Date of Patent: Dec. 20, 2022

(54) ON NET BUS FOR DISTRIBUTING FAX TRANSMISSIONS

(71) Applicant: j2 Cloud Services, LLC, Los Angeles, CA (US)

(72) Inventor: Francis Toscano, Kendall Park, NJ (US)

(73) Assignee: J2 CLOUD SERVICES, LLC, Los Angeles, CA (US)

( * ) Notice: Subject to any disclaimer, the term of this patent is extended or adjusted under 35 U.S.C. 154(b) by 0 days.

(21) Appl. No.: 17/338,582

(22) Filed: Jun. 3, 2021

(51) Int. Cl.
H04N 1/00 (2006.01)
H04N 1/327 (2006.01)
H04N 1/32 (2006.01)

(52) U.S. Cl.
CPC ........... *H04N 1/0022* (2013.01); *H04N 1/324* (2013.01); *H04N 1/32708* (2013.01); *H04N 2201/0093* (2013.01)

(58) Field of Classification Search
None
See application file for complete search history.

(56) References Cited

U.S. PATENT DOCUMENTS

| | | |
|---|---|---|
| 8,639,754 B2 | 1/2014 | Vendrow |
| 9,042,532 B2 | 5/2015 | Watts |
| 9,734,541 B1 | 8/2017 | Pinsonneault |
| 10,334,119 B2 | 6/2019 | Freeman |
| 10,694,067 B2 | 6/2020 | Toscano et al. |
| 2002/0101620 A1 | 8/2002 | Sharif et al. |
| 2004/0252349 A1* | 12/2004 | Green ............... H04N 1/32363 358/440 |
| 2005/0275871 A1 | 12/2005 | Baird et al. |
| 2006/0031364 A1 | 2/2006 | Hamilton et al. |
| 2006/0209333 A1 | 9/2006 | Takida |
| 2008/0104408 A1 | 5/2008 | Mayer |
| 2009/0067418 A1 | 3/2009 | Toscano |

(Continued)

FOREIGN PATENT DOCUMENTS

| | | |
|---|---|---|
| JP | 2015226174 A | 12/2015 |
| KR | 1020180124507 A | 11/2018 |
| KR | 1020190102763 A | 9/2019 |

OTHER PUBLICATIONS

PCT International Search Report And The Written Opinion Of The International Searching Authority, Or The Declaration, for PCT/US2022/018183, dated Jun. 9, 2022, 11 pages.

(Continued)

*Primary Examiner* — Lennin R Rodriguezgonzalez
(74) *Attorney, Agent, or Firm* — Womble Bond Dickinson (US) LLP

(57) ABSTRACT

Method and system are described for fax transmission distribution by an online fax service provider. In one embodiment, an electronic document is received, over a computer network, to be routed to a fax telephone number. A request is transmitted to an online database to determine whether the fax telephone number is registered to not receive incoming fax transmissions over a circuit-switched network. In response to determining that the fax telephone number is registered, the electronic document is transmitted to a destination address. In response to determining that the fax telephone number is not registered, an outgoing call is placed to the fax telephone number and the electronic document is transmitted in a fax format over the outgoing call.

20 Claims, 5 Drawing Sheets

(56) References Cited

U.S. PATENT DOCUMENTS

| | | |
|---|---|---|
| 2009/0190159 A1 | 7/2009 | Toscano et al. |
| 2010/0060926 A1 | 3/2010 | Smith et al. |
| 2010/0161993 A1 | 6/2010 | Mayer |
| 2010/0208726 A1 | 8/2010 | Oliszewski |
| 2010/0214590 A1 | 8/2010 | Ray et al. |
| 2011/0119088 A1 | 5/2011 | Gunn et al. |
| 2011/0179266 A1 | 7/2011 | Popesco |
| 2011/0310890 A1 | 12/2011 | Kanagi |
| 2012/0212763 A1 | 8/2012 | Honma |
| 2013/0038894 A1 | 2/2013 | Murphy |
| 2013/0096938 A1 | 4/2013 | Stueckemann et al. |
| 2014/0240760 A1 | 8/2014 | Dowling et al. |
| 2014/0268219 A1 | 9/2014 | Ho et al. |
| 2015/0081325 A1 | 3/2015 | Pletcher et al. |
| 2015/0195418 A1 | 7/2015 | Toscano |
| 2015/0234984 A1 | 8/2015 | Singer et al. |
| 2015/0278474 A1 | 10/2015 | Stueckemann et al. |
| 2016/0042483 A1 | 2/2016 | Vo et al. |
| 2016/0342752 A1 | 11/2016 | Stueckemann et al. |
| 2017/0064092 A1 | 3/2017 | Lennstrom |
| 2017/0187731 A1 | 6/2017 | Hatta |
| 2018/0249038 A1 | 8/2018 | Lehavi et al. |
| 2018/0294048 A1 | 10/2018 | Blumenthal et al. |
| 2019/0052770 A1 | 2/2019 | Kamens et al. |
| 2019/0156055 A1 | 5/2019 | Rosenberg et al. |
| 2019/0267123 A1 | 8/2019 | Stueckemann et al. |
| 2019/0356786 A1 | 11/2019 | Freeman |
| 2020/0106923 A1 | 4/2020 | Watts et al. |
| 2020/0327967 A1 | 10/2020 | Tevis et al. |
| 2020/0412887 A1 | 12/2020 | Cichielo et al. |

OTHER PUBLICATIONS

PCT International Search Report and Written Opinion for PCT/US2022/031638, dated Sep. 8, 2022, 10 pages.
PCT International Search Report And The Written Opinion Of The International Searching Authority, Or The Declaration for PCT/US2022/026046, dated Aug. 5, 2022, 10 pages.

* cited by examiner

ON NET BUS FOR DISTRIBUTING FAX TRANSMISSIONS

FIELD

An embodiment of the disclosure is related to a fax system that distributes fax transmissions. Other embodiments are also described.

BACKGROUND

Fax messaging continues to be an important avenue for delivery of secure messages between individuals worldwide despite the proliferation of message delivery services that use the Internet. Traditional fax messaging services require both a dedicated fax machine and a dedicated fax number to receive a fax transmission. Modern fax messaging services have eliminated the requirement for a dedicated fax machine, utilizing the Internet to provide greater flexibility for subscribers of those services to transmit and receive fax messages. For instance, a subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received at a particular DID telephone number, the fax messaging service generates a fax message from the fax transmission in a format that is suitable for transmission over a data network such as the Internet, and sends the fax message to the subscriber (e.g., to the subscriber's e-mail address).

SUMMARY

Voice and data communications systems such as the public switched telephone network (PSTN) are currently used to transfer image and text data transmitted by facsimile ("fax") machines in addition to the normally carried voice traffic. For instance, fax machines translate a physical document into data, which is then transmitted to a dedicated fax number, over the PSTN. This data is normally received for printout or storage of the image on a destination fax machine or computer for use by the recipient. This method of fax messaging, however, may add significant costs to a consumer's telephone bill. When setting up telephone and fax service, a consumer and a telephone company may enter into a contract that specifies a number of available or "free" minutes that are usable across dedicated voice and fax lines (or numbers) over a certain time period (e.g., a month). Once these minutes are exceeded, the telephone company may apply per-minute rates across these lines. As another example, a consumer may contract with a telephone company to only charge the consumer for the number of minutes (e.g., on a "per-minute basis") that are used across each (or some) of the consumer's lines. This may be convenient for consumers who do not make or receive a large volume of voice calls. Sending and receiving traditional faxes over dedicated fax lines, however, may require a considerable amount of time. For instance, depending on the baud rate at which fax data is transferred/received by a consumer's fax machine and depending on whether the fax includes text and/or images, a fax transmission may take between 1-5 minutes each page. If a consumer is regularly receiving multiple faxes (e.g., across multiple dedicated fax numbers), costs resulting from an increase in fax transmission times may begin to add up. Along with being costly, sending and receiving faxes using traditional fax methods may also be inefficient, as opposed to more modern fax services that utilize the Internet. For example, traditional faxes require a fax machine that may have significant up-front costs, as well as needing constant maintenance. In addition, while receiving an incoming fax transmission, the fax telephone number is unable to transmit or receive other faxes, thus creating an undesirable bottleneck.

To overcome these issues, some consumers may switch to more modern fax services to receive incoming faxes through the Internet. In some instances, however, consumers may be unable to make a quick and seamless transition. For example, some consumers may be contractually obligated with telephone companies to have dedicated fax lines bundled with their voice lines. Also, a consumer may have a considerable amount of dedicated fax numbers for receiving large volumes of fax transmissions. Having such a large volume of lines may make it difficult for a smooth transmission towards electronic faxing. Therefore, there is a need for a fax system that routes incoming fax transmissions through a data (e.g., computer) network, thus circumventing fax transmission to a dedicated fax telephone number over the PSTN. By circumventing the PSTN, a customer may receive incoming fax transmissions without using minutes from the telephone company, thereby providing a reliable and cost savings method of receiving faxes.

The instant disclosure is directed to a method performed by (e.g., a programmed processor of an electronic device, such as a server, of) an online fax service provider that transmits faxes through a computer network, while circumventing the PSTN. The fax system receives, over the computer network (e.g., Internet), an electronic document (e.g., a Portable Document Format (PDF) document that may include images and/or text) that is to be routed to a fax telephone number. The fax system transmits, over the computer network, a request to an online database to determine whether the fax telephone number is registered by its owner to not receive incoming fax transmissions over a circuit-switched network (e.g., the PSTN). For example, the online database may be owned and operated by an online service provider, which may be separate from the online fax service provider, that receives and registers fax telephone numbers of other online service providers who wish to receive incoming fax transmissions by means other than traditional fax messaging services that are through the PSTN. These other online service providers may prefer to receiving incoming fax transmissions this way in order to maintain any contractual obligations with their telephone companies, while at the same time reducing incoming fax traffic through their dedicated fax telephone numbers. In response to determining that the fax telephone number is registered, the fax system transmits, over the computer network, the electronic document to a destination address. For example, when the destination address is an e-mail address, the fax system may transmit the electronic document as an attachment in an e-mail that is designated to the e-mail address. Otherwise, in response to determining that the fax telephone number is not registered, the fax system may place an outgoing call to the fax telephone number and transmit the electronic document in a fax format over the outgoing call and through the PSTN.

The above summary does not include an exhaustive list of all embodiments of the present disclosure. It is contemplated that the disclosure includes all systems and methods that can be practiced from all suitable combinations of the various embodiments summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

DETAILED DESCRIPTION

Several embodiments of the disclosure with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
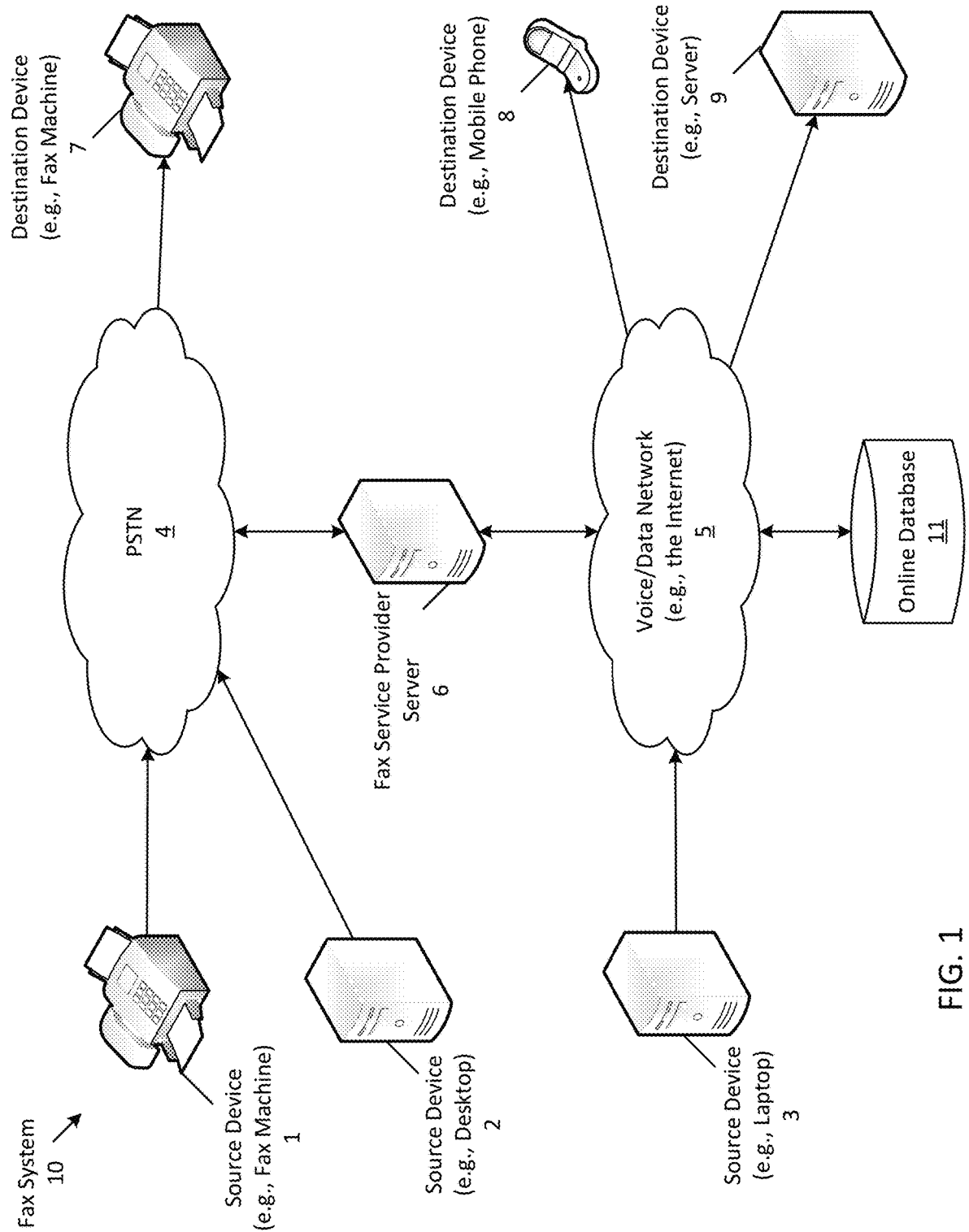
FIG. 1 is a block diagram illustrating a fax system, according to some embodiments.

FIG. 1 is a block diagram illustrating a fax (service provider) system 10, according to some embodiments. The fax system 10 includes three source (or originating) devices 1-3, a Public Switched Telephone Network (PSTN) 4, a voice/data (e.g., computer) network (e.g., the Internet) 5, one or more fax service provider servers (e.g., fax server(s) or electronic device(s)) 6, three destination devices 7-9, and an online database 11. In one embodiment, the system may include more or less (e.g., source, destination, etc.) devices.

As illustrated, the source devices 1 and 2 are coupled to the server 6 via the PSTN, and the source device 3 is coupled to the server via the computer network. As shown, source device 1 is a fax machine and source device 2 is a desktop computer. In one embodiment, devices 1 and 2 may be any electronic device that are capable of placing outgoing calls and/or receiving incoming (e.g., fax) calls over the PSTN 4, e.g., to (and from) the fax service provider server 6. For instance, the fax machine 1 may send a fax transmission through the PSTN 4 using a fax protocol such as the Group 3 protocol defined by the International Telecommunications Union telecommunication Standardization Sector (ITU-T) (e.g., as defined in ITU-T Recommendations T.30 and T.4). A user may operate the fax machine to thus send a fax transmission to a recipient, by for example placing a paper document into the fax machine and entering the phone (e.g., dedicated fax telephone) number of the recipient into the fax machine. The fax machine scans the paper document and converts the contents of the document into an electronic fax format. Alternatively, the machine may convert an electronic document into the electronic fax format. The fax machine places an outgoing call by utilising Dual-Tone Multi-Frequency (DTMF) signaling. Once the call is answered (e.g., by the server 6), the fax machine transmits the contents of the document, through the PSTN in the form of audio-frequency tones (e.g., a fax tone as per the Group 3 protocol). Once received, the fax transmission may be stored at the server (or more specifically in memory of the server) in a fax file format (e.g., Tagged Image File Format (TIFF)). In one embodiment, the desktop 2 may include a dial-up modem and telephony software, which when executed may use the dial-up modem to transmit a fax transmission via the PSTN. Specifically, the software may be configured to receive (e.g., via a Graphical User Interface (GUI) displayed on a display screen coupled to the desktop) a fax telephone number to which a document is to be transmitted. The desktop may convert the document into the fax file format and place an outgoing call using the dial-up modem to establish a dial-up connection with the server 6 via the PSTN. Once established, the desktop may transmit the fax file, as described herein.

The source device 3 is coupled to the server 6 via the computer network 5. As shown, the source device 3 is a laptop computer. In another embodiment, however, device 3 may be any type of device that is capable of transmitting (electronic) fax transmissions (e.g., as an electronic message) that include one or more electronic documents over the computer network to the fax service provider server 6. In particular, the source device 3 may include fax software, which when executed by the device is configured to send fax transmissions as electronic messages that include fax files (or fax messages) in any format to a fax telephone number, as described herein. In one embodiment, the electronic message may be e-mail (a Simple Mail Transfer Protocol (SMTP) message) with the fax message attached. As another example, the source device 3 may establish a communication data connection (e.g., using an Application Programming Interface (API)) with the fax server 6, and transmit an electronic fax over the connection. For instance, the source device may establish a communication data connection using an API, according to a communication protocol, such as file transfer protocol (FTP), hypertext transfer protocol (HTTP), etc. In another embodiment, the source device may establish a secure communication data connection, such as Secure Sockets Layer (SSL), Transport Layer Security (TLS) for secure HTTP (HTTPS) and FTPS, and secure shell (SHH) for secure FTP (SFTP) and secure copy (SCP), etc., with the fax server. Once the secure communication data connection established, the source device (encrypts and) transmits incoming fax transmission data (e.g., as on or more internet protocol (IP) data packets, etc.) to the fax server according to the encryption protocol. In some embodiments, the source device may establish a secure communication tunnel with the fax server. For instance, the source device may establish using an IP address or domain name of the fax server, a Virtual Personal Network (VPN) connection. Once established, the source device may transmit the electronic messages via the VPN connection. For instance, the source device may establish a communication data connection with a VPN server through which (e.g., a VPN connection is established in which) the source device may communicate with the fax server (e.g., using any communication protocol, such as HTTPS). As another example, once the secure communication tunnel is established, the source device may transmit an e-mail with the fax message, as described herein. In another embodiment, the source device may transmit the message to the fax server using any known method. In some embodiments, the source device 3 may be a portable device, such as a mobile phone (or smart phone) that includes fax software for transmitting faxes over the data network 5 and/or the PSTN 4.

Also shown, the destination device 7 is a fax machine that is coupled to the server 6 via the PSTN 4. The destination devices 8 and 9 are a mobile phone and (one or more) server(s), respectively, which are coupled to server 6 via the computer network 5. In one embodiment, device 7 may be any electronic device that is capable of transmitting/receiving fax transmissions over the PSTN, and devices 8 and 9 may be any electronic device that is capable of transmitting/receiving fax transmissions over the computer network 5, as described herein. More about transmitting and receiving fax transmissions over computer network is described herein.

In one embodiment, although some (e.g., source and/or destination) devices are illustrated as being coupled through a specific network, at least some of the devices may be configured to couple through one or more networks. For example, the source device 2 may be configured to transmit messages to the server (and/or to one or more destination devices), via the PSTN 4 and/or the data network 5. In another embodiment, at least some of the source and/or destination devices may be capable of performing fax transmission operations, as described herein.

In one embodiment, the voice/data network 5 may include infrastructure that enables one or more devices to send and receive fax transmissions (e.g., as electronic messages), such as routers, access points, one or more servers, etc. In some embodiments, the network may also include one or more cell towers, all of which may be part of a communication network that supports data transmission (and/or voice calls) for mobile devices (e.g., a 4G Long Term Evolution (LTE) network). More about the infrastructure of the network is described herein.

In another embodiment, the PSTN 4 may be a combination (e.g., having one or more) circuit-switched (telephone) networks that may be operated by one or more telephony operators in order to allow telephones and/or fax machines to communicate with one another.

The fax service provider server 6 is a stand-alone server computer or a cluster of server computers configured to perform one or more fax service provider operations, as described herein. In one embodiment, the server may be a part of a cloud computing system that is capable of performing online fax service provider operations as a cloud-based service. More about these operations is described herein.

The online database 11 may be any electronic device that is configured to communicate over the computer network 5, and is configured to receive, store, and/or transmit data. Specifically, the database may include memory (e.g., non-volatile memory) that is arranged to store the data and one or more processors. For example, the database may be an electronic server (or server computer), a desktop computer, etc. The database is configured to store data such as a registry of fax telephone numbers to which incoming fax transmissions are to be routed through the computer network 5 rather than being distributed to the numbers through the PSTN 4. Specifically, the database may include a table (e.g., as a data structure) that includes a list of one or more fax telephone numbers. In one embodiment, the table may include other information associated with the registered numbers. For instance, at least some of the numbers may be associated with one or more destination addresses (e.g., an e-mail address, an IP address, etc.) to which incoming fax transmissions are to be distributed (or transmitted) via the computer network. In some embodiments, the table may include information as to how incoming faxes are to be transmitted through the computer network 5, such as one or more communication protocols, such as FTP, HTTP, HTTPS, FTPS, SFTP, SCP, etc. In another embodiment, the database may include other information, such as a file format of which incoming fax transmissions are to be routed to the destination addresses.

In some embodiments, the fax service provider server 6 is configured to communicate (e.g., via e-mail, secure connection, etc., as described herein) with the online database 11 and/or at least some destination devices (e.g., devices 8 and 9) in order to distribute incoming fax transmissions. For instance, the fax server may communicate with the database to route incoming fax transmissions over the computer network, rather than routing the transmissions over the PSTN. For instance, the server may establish a communication data connection using an API, according to a communication protocol (e.g., SFTP) with the database. Once a connection between the fax server and the online database is established, the server and the database may be configured to communicate (e.g., exchange messages) to determine whether a fax telephone number associated with an incoming fax transmission received by the fax server is registered with the online database. If so, the fax server may be configured to route the incoming fax transmission (e.g., the fax file contained within a received electronic message, such as an e-mail, for example) to a destination address (that is associated with an owner or user of the fax telephone number) through the data network 5, thereby circumventing the PSTN 4. Thus, the server and the online database create an online bus (or on net bus) in which fax transmissions may be distributed over the computer network without ever having to place an outgoing call through the PSTN 4. More about the operations performed by the server and the online database is described herein.

In one embodiment, the online database 11 may be owned and/or operated by a different entity (e.g., an online database service provider) than the fax service provider that of the server 6. In another embodiment, the fax telephone numbers that are registered in the database may be owned by (or associated with) one or more online service providers who purchased the respective fax telephone numbers from one or more telephone companies. In some embodiments, the one or more online service providers, the fax service provider, and/or the online database service provider may be different providers with respect to one another.

As described thus far, the online database 11 may be a separate component that may be owned and/or operated by a different provider than the server 6. In some embodiments, the online database 11 may be associated with the server 6.

In this case, the online database may be a part of (or communicatively coupled with) data storage of the server 6. As a result, the online database and the server may be owned and/or operated by the fax service provider.

Figure 2:
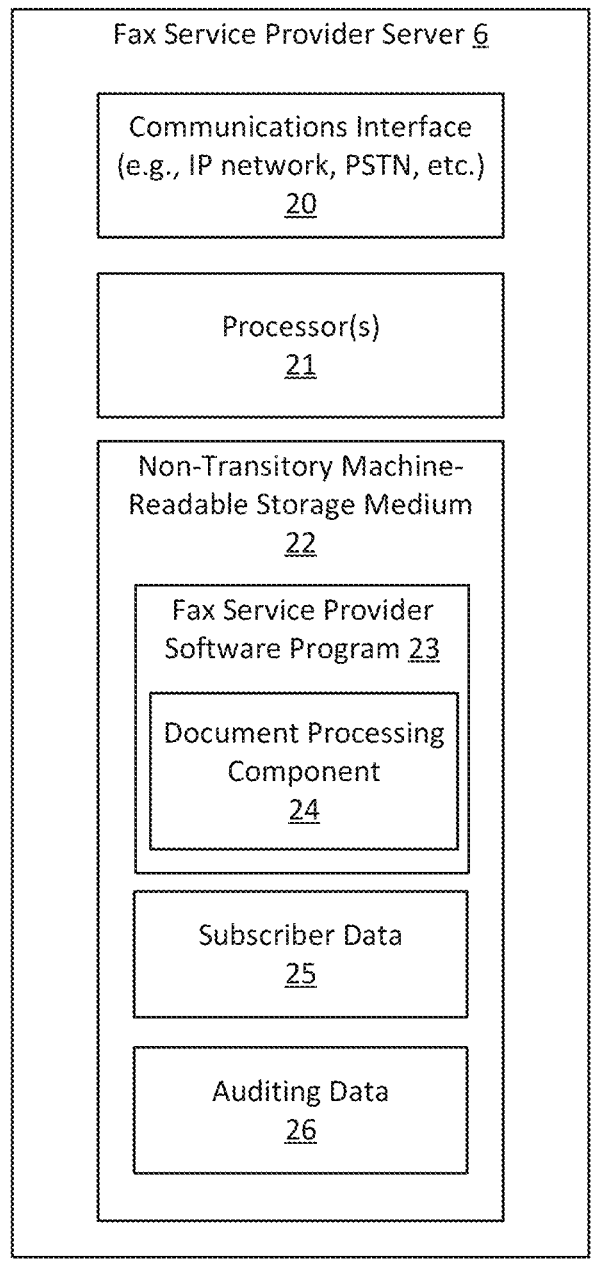
FIG. 2 shows a block diagram illustrating a fax service provider server, according to some embodiments.

FIG. 2 shows a block diagram illustrating the fax service provider server 6, according to some embodiments. The fax server is operated by one or more fax service providers, and is capable of processing fax transmissions destined for outbound (or recipient) addresses (e.g., fax telephone numbers). In one embodiment, the fax server may be configured to process and/or distribute incoming fax transmissions to subscribers of one or more fax services that are offered by the fax service provider. Typically, fax services (or more specifically the fax service provider) assigns a different Direct Inward Dialing (DID) telephone number (e.g., fax telephone number) to each subscriber. A subscriber distributes the DID number to others who wish to send a fax message (as an incoming fax transmission) to the subscriber. The DID number is in effect the subscriber's individual fax number. When a sending party sends a fax transmission to the subscriber's DID number (e.g., over the PSTN as described herein), the server receives the fax transmission and generates a fax message from (or decode message content in) the fax transmission. The generated fax message may be in a format that is viewable by the subscriber on an electronic (e.g., destination) device, e.g., Portable Document Format (PDF), TIFF, etc., and is made available to the subscriber (e.g., for viewing).

In another embodiment, the fax server 6 may receive an incoming fax transmission (e.g., as an electronic message) over the voice/data network 5. For example, the server 6 may receive an incoming fax transmission via a communication data connection established between the server and a source device (e.g., source device 3), as described herein. As an example, a user (e.g., a subscriber or a non-subscriber) may transmit an e-mail over the data network (e.g., Internet) that includes (e.g., as an attachment) a fax file (message or transmission). In one embodiment, the fax file may be in a fax format, such as TIFF. In another embodiment, the fax file may be a document that includes text and/or images. In some embodiments, the fax file may be a searchable electronic document, such as a searchable PDF. In some embodiments, the fax file may be in a format that is executable by one or more applications that allows a user to search, add, remove, and/or edit data (e.g., text, images, etc.) in the file. For example, the file may be in a word processing format that is executable by a word processing software application, a spreadsheet format that is executable by a spreadsheet software application, a presentation format that is executable by a presentation application. In one embodiment, the fax file may be in any file format that is editable and/or searchable. In one embodiment, the fax server may receive the incoming fax transmission over the data network 5 through any known method.

In one embodiment, the received electronic message may also include an outbound (or recipient) address to which the fax file contained therein is being transmitted. For example, when transmitting the fax over a data communication connection established between the server and a source device, the outbound address (e.g., a fax telephone number) may be included as metadata in one or more headers of the one or more IP packets that are used to transmit the fax. As another example, when the fax is transmitted as an e-mail, an e-mail address to which the e-mail is addressed may include the outbound address and/or identifying information of a recipient, which may be a subscriber of one or more fax services. For example, the recipient address may be the user name of the e-mail address, which may be a fax telephone number (e.g., a DID telephone number that is assigned to a subscriber) to which the fax may be distributed (e.g., by a fax transmission over the PSTN), and the domain name of the e-mail address may be associated with the fax service provider. In another embodiment, the recipient address may be a part of a body of the e-mail, which may be identified by the fax server 6 (e.g., via a character recognition algorithm).

In one embodiment, the fax server 6 may process and/or distribute incoming fax transmissions based on the recipient address. Specifically, once an electronic message is received, the fax server may determine how to distribute (and process) the fax transmission based on whether the recipient address (e.g., fax telephone number) of the incoming fax is assigned to a subscriber of one or more fax services. For example, when the incoming fax transmission is destined to a subscriber's fax telephone number, the fax server 6 may make the fax message of the incoming fax transmission available to the subscriber through various means. In one embodiment, the fax server may transmit the fax message to an e-mail address (e.g., a destination address) of the subscriber. In another embodiment, the fax server stores the fax message in a data storage until it is accessed by the subscriber over the computer network 5. For example, the fax message may remain stored on a web server accessible over the Internet. In another embodiment, a notification is sent to (addressed to) the subscriber that indicates that a new fax message is available, such as a Short Message Service (SMS) message. In one embodiment, the notification may include information as to how to access the new fax message (e.g., an e-mail notification may contain a link, such as a Uniform Resource Locator (URL), to the stored location of the fax message). In another embodiment, the notification may be transmitted as any type of electronic message (e.g., a SMS message, a Multimedia Messaging Service (MMS) message, etc.) to a known telephone number associated to the subscriber. In this case, the electronic message may include the information mentioned above, such as a URL. In another embodiment, the messages (e.g., MMS messages) may include the generated fax message as an attachment (e.g., as a PDF document).

In another embodiment, the fax server may transmit (e.g., route) an incoming fax transmission that is received from a source device in a similar manner as described herein to one or more destination devices. For instance, the fax server may transmit a fax transmission via the PSTN 4 to a destination device (e.g., device 7). In particular, the fax server may place an outgoing call (e.g., to a fax telephone number associated with a subscriber), and once the call is answered the fax server transmits the fax transmission, as described herein.

In some embodiments, the fax server 6 may transmit (or distribute) an incoming fax transmission (or more specifically the fax file received in the transmission) over a communication data connection with one or more destination devices. In particular, the fax server may be configured to establish, over the computer network 5 and via an API, a communication data connection with a destination device, such as server 9 using a destination address of the server, for example an IP address or a domain name. Once established, the fax server may transmit an electronic message (e.g., as one or more data packets, such as IP packets) that includes the fax transmission (or more specifically the fax file or processed fax file) over the data connection to the destination device. In one embodiment, the fax server may establish a connection via a website that is hosted by (or on) the destination device. In this case, the destination address may be a URL, which includes the domain name associated with the destination device. The fax server may establish a data connection to the URL according to any data transfer (application) protocol described herein, HTTP, FTP, etc. In some embodiments, the fax server may use any (e.g., Application layer) protocol in the server's protocol stack to establish a connection with a destination device and transmit data (e.g., as one or more data packets).

In some embodiments, the fax server 6 may transmit the electronic message as an e-mail (e.g., a SMTP message). In this case, the electronic message may be contained (e.g., as text) within the body of the e-mail. In another embodiment, the electronic message may include the fax message (e.g., the electronic document) as an attachment to the e-mail, which is formatted according to the Multipurpose Internet Mail Extensions (MIME) protocol.

In another embodiment, the fax server 6 may establish a secure communication data connection with the destination device, as described herein. Specifically, the fax server may establish, over the computer network 5 a communication data connection with destination device according to its destination address (e.g., IP address) and using an encryption protocol, such as SSL, TLS, etc. For instance, to access the website hosted by the destination device, the fax server may use the application layer protocol HTTP over TLS or SSL (e.g., HTTPS). Once the secure communication data connection established, the fax server (encrypts and) transmits data (e.g., electronic messages) to the destination device according to the encryption protocol. In some embodiments, the fax server may establish a secure communication tunnel with the destination device. For instance, the fax server may establish using the IP address or domain name of the destination device, a VPN connection with the destination device. Once established, the fax server may transmit the electronic message via the VPN connection, as described herein.

In some embodiments, the fax server 6 may distribute incoming fax transmissions according to one or more (e.g., international) standards for data transfers. In particular, when distributing incoming fax transmissions to healthcare service providers (or systems), such as doctors, Electronic Medical Record (EMR) systems (or Electronic Healthcare Records (EHR) systems), healthcare insurers, doctors, medical technicians, pharmacists, etc., the fax server may generate and transmit electronic messages that include at least a portion of the incoming fax transmission according to the one or more international medical format messaging standards, such as Health Level Seven (HL7) standard, Digital Imaging and Communication in Medicine (DICOM) standard, etc. For example, upon receiving an incoming fax transmission that includes a fax file (e.g., a medical or patient record) that is to be routed to a EMR service provider (e.g., server), the fax software may generate a HL7 message that includes the fax file. In one embodiment, to generate the HL7 message, the fax server may embed the fax file into one or more segments of an HL7 message. For instance, when the fax file is a PDF file that includes medical data (e.g., text, images, etc.), the fax software may embed the (e.g., medical data of the) file into the HL7 message. In one embodiment, the fax software may attach (or embed) any type of file format into an HL7 message in order to generate the electronic message. In some embodiments, along with the fax file, patient information may also be added into the message, such as the fax telephone number. Once the electronic HL7 message is generated, the fax server may transmit the message to a destination device (or address) according to one or more communication protocols of the Transmission Control Protocol/Internet Protocol (TCP/IP). For instance, the destination address may be an IP address of server 9, which may be an EHR service provider.

In one embodiment, in addition to (or in lieu of) transmitting the fax file as a HL7 message, the fax server may convert (or generate) the fax file into another document type (or format). In particular, the fax server may convert the fax file into a HL7-Clinical Document Architecture (CDA) document that is a HL7 standard for the representation and machine processing of clinical documents. For instance, the fax server may encode (or embed) the fax file, which may be any file format such as a PDF, TIFF, word processing format, etc., as the body of the HL7-CDA document. In one embodiment, transmitting a HL7-CDA document may be preferable rather than simply transmitting the fax file (e.g., word processing document), since metadata may be added to a header of the HL7-CDA document, such as the fax telephone number.

In some embodiments, the fax server 6 may distribute (and/or receive) fax files as secure direct messages in order to protect sensitive information. For instance, the fax server may generate and transmit secure messages that are Health Insurance Portability and Accountability (HIPPA) compliant. For instance, the fax server may encrypt the fax file according to HIPAA requirements, and may transmit the encrypted file across a secure connection to a destination address (e.g., via HTTPS). In one embodiment, the fax server may use any known method to encrypt (and/or decrypt) fax files in order to produce secure messages.

As described thus far, the fax server 6 may be configured to establish a communication data connection with one or more destination devices in order to transmit (or distribute) fax files of incoming fax transmissions. In another embodiment, the fax server may receive incoming fax transmissions through one or more communication data connections with a source device, such as laptop 3. For instance, the source device may establish any of the communication data connections with the fax server, as described herein. For example, the source device may access a website hosted by the fax service provider server 6 and transmit an incoming fax according to any Application Layer Protocol, such as HTTPS.

The server includes a communication interface 20, one or more processors 21, and a non-transitory machine-readable storage medium 22. Examples of non-transitory machine-readable storage medium may include read-only memory, random-access memory, CD-ROMS, DVDs, magnetic tape, optical data storage devices, flash memory devices, and phase change memory. Although illustrated as being contained within the server 6, one or more of the components may be a part of separate electronic devices, such as the medium 22 being a separate data storage device. For example, the storage medium may be a part of (or contain) the online database 11. As shown, the non-transitory machine-readable storage medium has stored therein a fax service provider software program (or fax software) 23 and subscriber data 25, and auditing data 26. The fax software includes a document processing component 24, which when executed by the one or more processors becomes configured to process an incoming fax transmission to generate a searchable electronic document and/or to add an electronic signature, as described herein.

The communications interface 20 provides an interface for the fax server 6 to communicate with the source devices 1-3 (in order to receive incoming fax transmission, the destination devices 7-9 (in order to transmit (or route) incoming fax transmissions), and the online database 11, as described herein. For example, the communication interface is configured to establish a communication link with source device 1 over the PSTN in which an incoming fax is received through a downlink signal, and is configured to establish a communication link with destination device 7 over the PSTN in which a fax is transmitted through an uplink signal. Similarly, the interface is configured to establish a data connection (such as a VPN connection) with one or more destination devices.

In one embodiment, the subscriber data 25 may include information of subscribers of one or more fax services. Specifically, the data may be in the form of a data structure that includes a lookup table having subscriber (e.g., identifying) information, such as the subscriber's name, the subscriber's personal telephone number (which may be associated with a destination device, such as the mobile phone 8), and a subscriber's assigned DID telephone number. In some embodiments, the data structure may include one or more destination addresses to which the fax service provider transmits (e.g., routes, forwards, or distributes) incoming fax transmissions that are received for a specific subscriber. For example, a subscriber's destination addresses may include an e-mail address, a (e.g., voice) telephone number, a fax telephone number, an IP address, etc. In another embodiment, the subscriber data may also include what communication protocols are to be used to transmit (and/or receive) incoming fax transmissions, as described herein. In one embodiment, the subscriber data may include subscriber settings or preferences, such as which destination address the subscriber wishes incoming fax transmissions to be distributed by the fax system. In particular, such a preference may be based on a source address from which the incoming fax transmission is received. For instance, a source address may be a fax telephone number of source device 1, which is used to transmit a fax file to a recipient's address (e.g., a fax telephone number, such as a subscriber's DID telephone number). In this case, the subscriber data may associate the source address to one or more destination addresses to which (future) incoming fax transmissions from the source address are to be distributed. In another embodiment, the subscriber preferences may indicate what format fax transmissions are to be transmitted to a subscriber. For instance, a subscriber's preferences may indicate that incoming fax transmissions are to be distributed to the subscriber in a fax format, such as TIFF, and/or to be routed in another format, such as PDF. As another example, the subscriber data may indicate how to format fax transmissions to specific destination address. For instance, for a destination address associated with a EHR service provider, the data may indicate that fax transmission are to be transmitted as HL7-CDA messages, while a destination address associated with another healthcare service provider may be transmitted over the PSTN. In one embodiment, the subscriber preferences may indicate whether the (document processing component 24 of the) fax software is to perform additional (or special) processing operations upon incoming fax transmissions. More about the operations performed by the component 24 is described herein.

Figure 5:
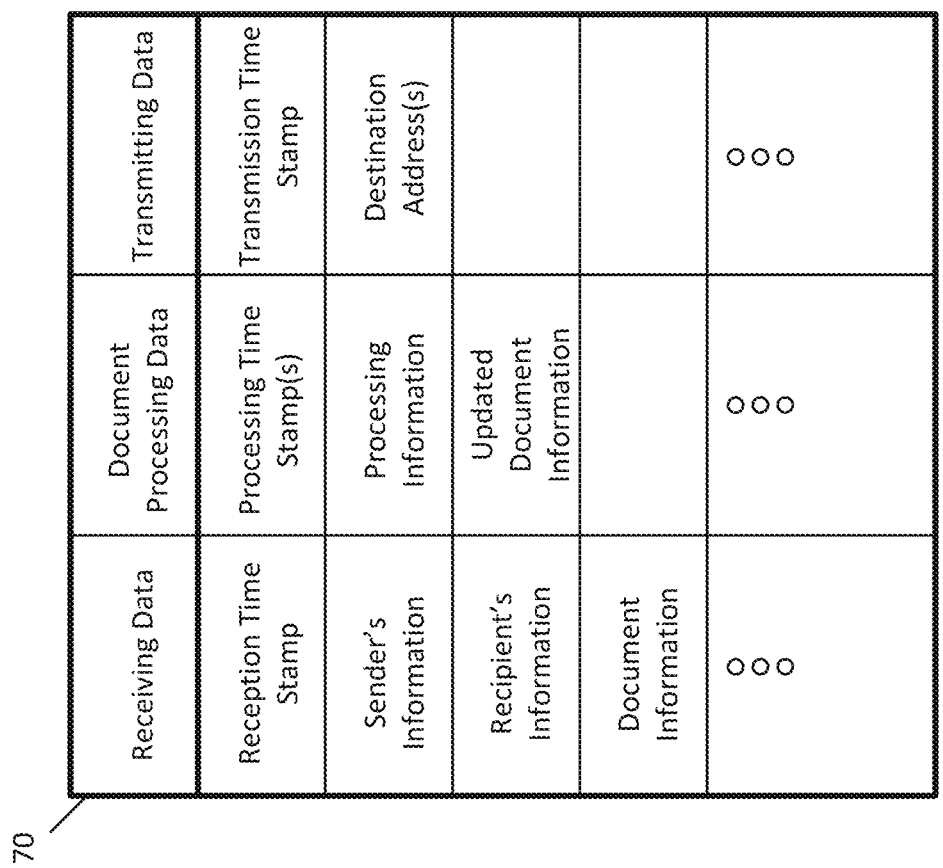
FIG. 5 illustrates a data structure that includes auditing data associated with the processing of fax transmissions, according to some embodiments.

In some embodiments, the auditing data 26 may include information regarding fax transmissions that have been received, processed, and/or transmitted (or routed) by the fax service provider server 6. For example, the auditing data may be stored in a data structure (e.g., as illustrated in FIG. 5) that includes information, such as time stamps and document information of incoming fax transmissions. More about the auditing data is described herein.

The processor 21 may include one or more data processing circuits, generically referred to herein as "a processor."

The processor may execute the fax software 23 that is (at least partially) stored within memory 22 to perform some or all of the fax service provider operations and methods that are described herein, for one or more of the embodiments related to the server 6. In particular, the fax software (e.g., which when executed by the processor 21) is capable of processing fax transmissions. For instance, the fax software is configured to receive an incoming fax transmission (e.g., an electronic message that includes an electronic document) and a fax telephone number as an outbound address to which the fax is being transmitted by a source device. The fax software is configured to determine whether the fax telephone number is registered with the online database, and is configured to distribute the incoming fax transmission according to the determination. More about the operations performed by the fax software is described herein.

In one embodiment, the document processing component 24 of the fax program 23 is configured to process a received fax transmission. For instance, the received fax transmission may be an electronic message (e.g., via e-mail, communication data connection, etc.). that includes a (e.g., first) searchable electronic document in any format, such as a word processing format, a spreadsheet format, or a presentation format, as described herein. The component generates another (e.g., second) searchable electronic document (e.g., in another file format that is different than the first document's file format) from the first searchable electronic document. For instance, the second searchable electronic document may be a searchable PDF document, which is generated from a word processing document. In one embodiment, the generated second searchable electronic document may preserve (or retain) all formatting of the first document (e.g., font, font size, font color, spacing, margins, alignment, etc.). For instance, the generated searchable PDF document may include embedded fonts from the first searchable electronic document (e.g., word processing document). The component adds an electronic signature to authenticate the second document, and the second document is transmitted to a destination device. Thus, the routed fax transmission remains a searchable document and includes an electronic signature that authenticates the transmission of the document. This is in contrast to conventional fax transmissions, which are transmitted in non-searchable fax formats, such as TIFFs.

Figure 3:
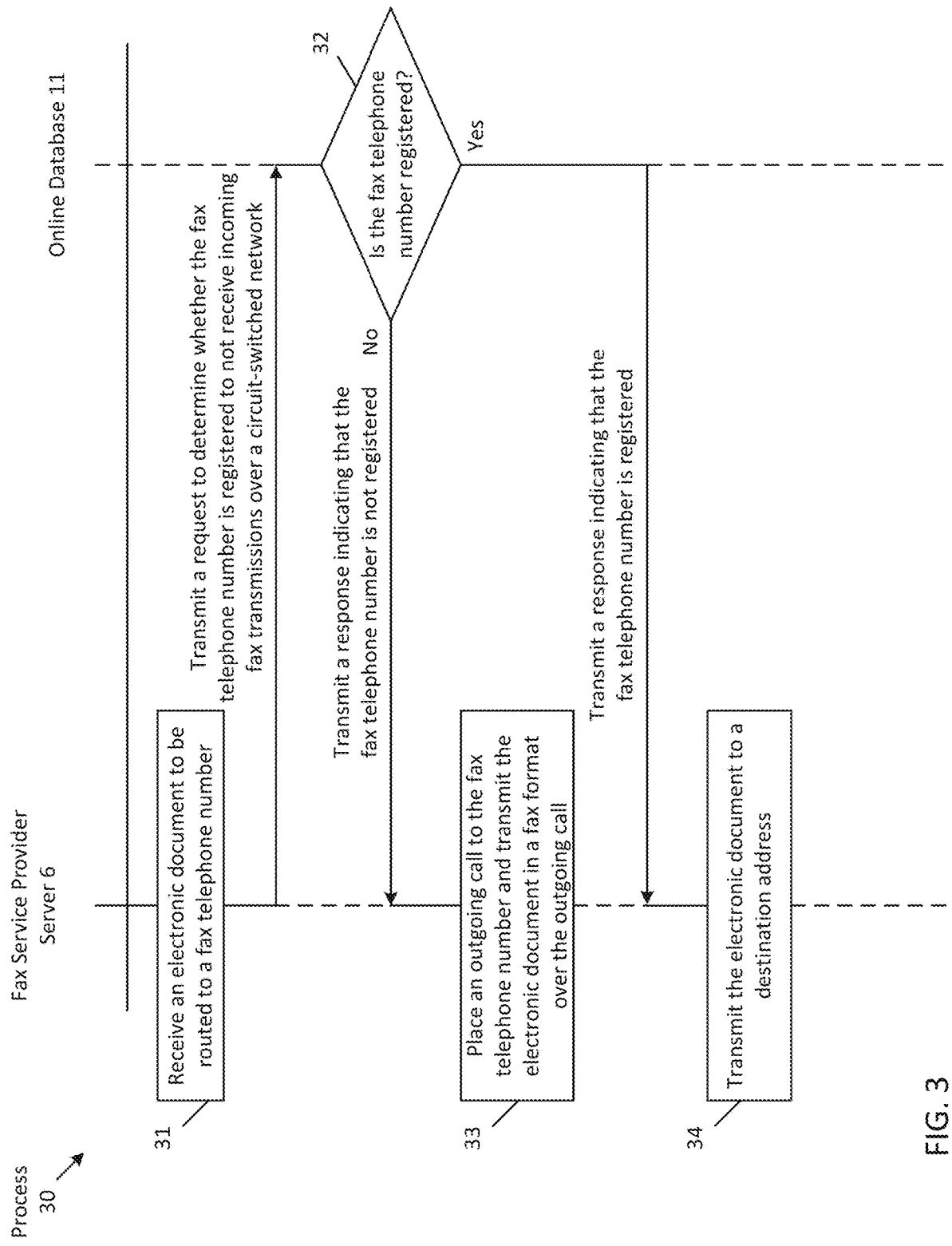
FIG. 3 shows a signal diagram of one embodiment of a process for distributing an incoming fax transmission to a fax telephone number based on whether the fax telephone number is registered with an online database, according to some embodiments.
Figure 4:
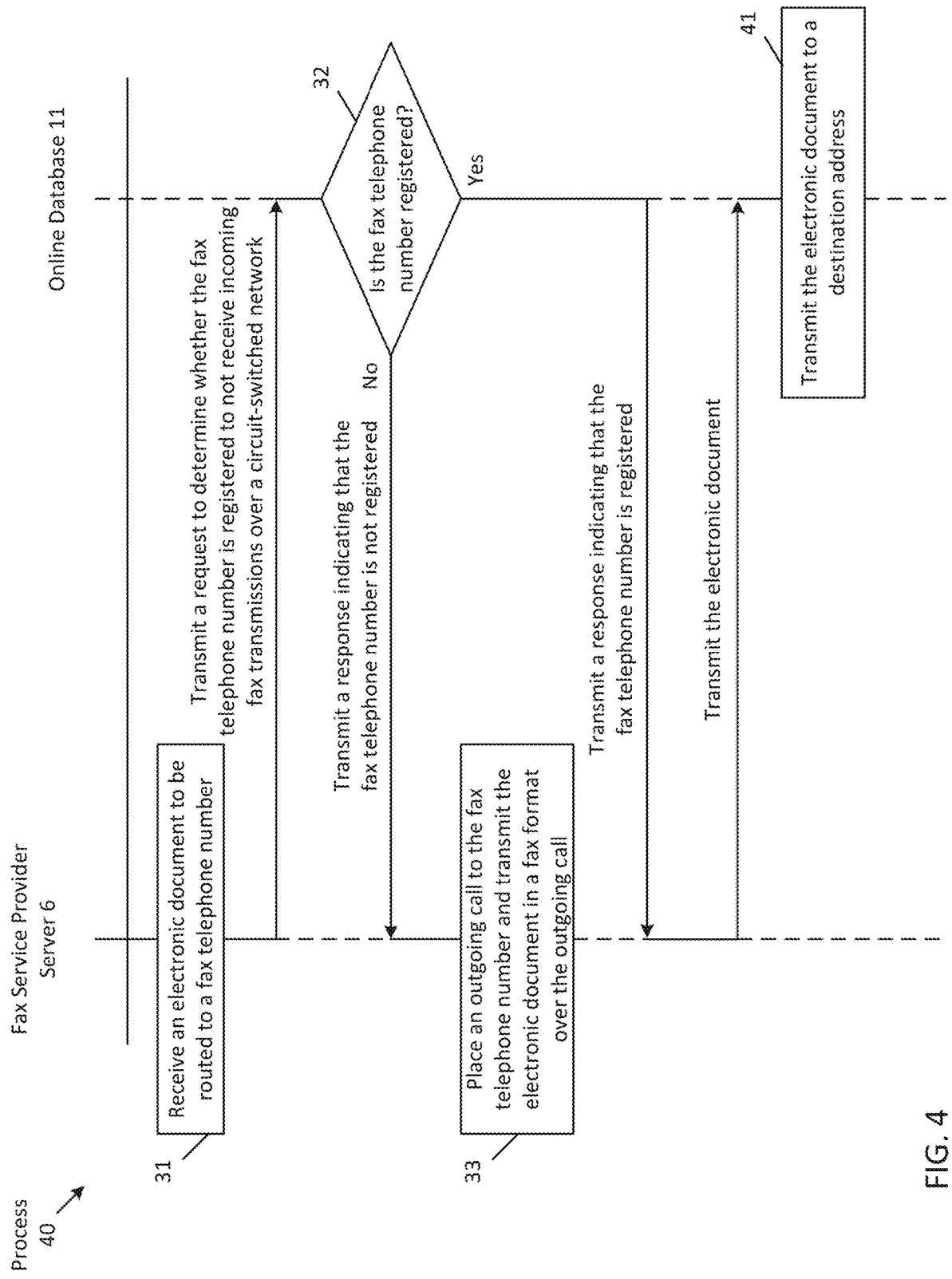
FIG. 4 shows a signal diagram of another embodiment of a process for distributing an incoming fax transmission to a fax telephone number based on whether the fax telephone number is registered with the online database, according to some embodiments.

FIGS. 3 and 4 are signal diagrams of processes 30 and 40, respectively, for receiving and distributing incoming fax transmissions using an online database, according to some embodiments. These processes may be performed by the (e.g., fax service provider software program 23 of the) fax service provider server 6 and the online database 11 of the fax system 10 illustrated in FIG. 1. For example, the fax software that is being executed by one or more processors 21 of the server 6 may perform at least some of the operations described herein.

FIG. 3 shows a signal diagram of one embodiment of the process 30 for distributing an incoming fax transmission to a fax telephone number based on whether the fax telephone number is registered with an online database, according to some embodiments. The process 30 begins by the fax server 6 receiving, over the computer network 5, an electronic document to be routed to a fax telephone number (at block 31). Specifically, the fax server receives an incoming fax transmission (e.g., an electronic message) that includes the electronic document and the fax telephone number. For instance, when the fax transmission is an e-mail, the document may be an attachment and the fax telephone number may be the e-mail address to which the e-mail is addressed, as described herein. In one embodiment, the document may be in any format, such as a fax format (e.g., TIFF, etc.). In another embodiment, the electronic document may be a (e.g., first) searchable electronic document in any format, such as a word processing format, PDF, etc., as described herein. Such a document may include (embedded) formatting (e.g., as metadata), such as font selection, font size, font color, spacing, margins, alignment, images overlaid on the document, etc. In some embodiments, the recipient address may be data (e.g., metadata) that is a part of (e.g., a header of one or more data packets that include) the fax transmission. For example, the electronic document may be received via a communication data connection that is (e.g., previously) established between a source device and the fax server, as described herein. In one embodiment, the fax telephone number may be received based on the established connection. For instance, the fax telephone number may be a part of a domain of a URL that is used to establish a connection over a file transfer protocol, such as HTTPS.

The fax server transmits a request message to the online database 11 to determine whether the fax telephone number of the incoming fax transmission (the transmission's outbound address) is registered with the database to not receive incoming fax transmissions over a circuit-switched network (e.g., PSTN). In one embodiment, the fax server and the online database may be communicatively coupled via a communication data connection through which the request message may be transmitted. In some embodiments, if the connection is not already established, the fax server may establish the connection to an address (e.g., IP address) of the database using an API, and once established may transmit the request message.

The online database 11 is configured to receive the request message from the server 6, and determines whether the fax telephone number is registered (at decision block 32). For instance, the online database may perform a table lookup into the stored data structure that includes registered fax telephone numbers and additional information, as described herein. In one embodiment, the determination may be based on whether the fax telephone number matches a stored fax telephone number within the database. In another embodiment, the determination may be based on whether an owner of the fax telephone number has subscribed with the online service provider of the database to register the number. If the fax telephone number is not registered, the online database transmits a response message to the server 6 indicating that the fax telephone number is not registered. The server 6 receives the response message, and (e.g., in response to receiving the response message) proceeds to transmit the fax telephone number over the PSTN. In particular, the server places an outgoing call to the fax telephone number and transmits the electronic document in a fax format over the outgoing call (at block 33). For instance, the server may convert the electronic document (if not already in a fax format), into the fax format, which may be a TIFF.

If, however, the fax telephone number is registered with the online database 11 at decision block 32, the database transmits a response message to the server 6, indicating that the fax telephone number is registered. The fax server 6 (e.g., in response to determining that the fax telephone number is registered) transmits, over the computer network, the electronic document to a destination address (at block 34). For instance, when the destination address is an e-mail address associated with a user of the fax telephone number, the fax server transmits an e-mail that includes the electronic document as an attachment. In one embodiment, the transmission may also include additional information, such as the fax telephone number.

In one embodiment, the destination address and/or additional information may be received from the online database. For example, the response message may include the destination address, which may be stored in the online database 11. In another embodiment, the response message may include additional information, such as the method of which the electronic document is to be transmitted to the destination address. For instance, the response message may include a communication protocol (e.g., SFTP), over which the electronic document is to be transmitted to the destination address, which may be an IP address. Thus, when transmitting the electronic document, the server 6 may establish a communication data connection to the destination address and transmit the electronic document, according to the communication protocol. In another embodiment, the information may be stored in the fax server. For example, upon receiving the response message, the fax server may perform a table lookup using the fax telephone number into a table that associates fax telephone numbers (e.g., of subscribers and/or non-subscribers) with destination addresses.

As described herein, the electronic document may be in any file format, such as a PDF, etc., that includes text and/or at least one image. In one embodiment, when transmitting the electronic document, the fax server may convert the document into another file format. For instance, the server 6 may convert the electronic document in a fax format, such as a TIFF, as described herein. In one embodiment, the server 6 may convert the document into the fax format at any step along the process 30, such as when the document is received at block 31. Thus, the electronic document may be transmitted over the computer network to the destination address in the fax format.

FIG. 4 shows a signal diagram of another embodiment of the process 40 for distributing an incoming fax transmission to a fax telephone number based on whether the fax telephone number is registered with the online database, according to some embodiments. Specifically, this process illustrates operations in which the online database 11 transmits incoming fax transmissions over the computer network when fax telephone numbers of the incoming fax transmissions are registered, which is in contrast to process 30 of FIG. 3 in which the server 6 routes incoming fax transmissions.

As shown, the process 40 includes one or more operations performed in process 30 of FIG. 3. Thus, at least some of these operations may be performed by the server 6 and/or the database 11 in a similar fashion in process 40 as described in process 30 of FIG. 3. For instance, the fax server 6 receives an electronic document to be routed to a fax telephone number at block 31, transmits a request to the database 11. The database determines whether the fax telephone number is registered at decision block 32, and in response to not being registered, the fax server transmits the electronic document in a fax format over an outgoing call at block 33. Otherwise, however, if the fax telephone number is registered, the online database transmits a response message to the fax server 6 indicating that the fax telephone number is registered. Process 40 deviates from process 30 in that, in response to the response message the fax server transmits the electronic document to the online database 11. For instance, the fax server and the database may be communicatively coupled via a communication data connection that has been established between the fax server and (e.g., a destination address of) the online database 11. The fax server may transmit an electronic message that includes the document through the established communication data connection to the database.

The online database 11 is configured to receive the electronic document, and is configured to transmit the electronic document to a destination address (at block 41). Specifically, the online database 11 may be configured to determine the destination address based on the registered fax telephone number. For instance, upon performing a table lookup to determine the fax telephone number is registered, the table may also include other information, such as one or more destination addresses, as described herein. Thus, the online database becomes configured to route the electronic document to a (e.g., stored) destination address, such that a user of the address may receive the document over the computer network 5 and while circumventing the PSTN 4. In some embodiments, the destination address to which the online database transmits the document may be unknown to the online service provider of the fax server 6. This allows online service providers who register their fax telephone numbers with the online database 11 to remain anonymous from the fax server 6. In another embodiment, however, the destination address to which the online database transmits the document may be received from the fax server (e.g., along with the electronic document).

Some embodiments perform variations of the processes 30 and/or 40. For example, the specific operations of at least some of these processes may not be performed in the exact order shown and described. The specific operations may not be performed in one continuous series of operations, some operations may be omitted, and different specific operations may be performed in different embodiments. For instance, the operations performed by processes 30 and/or 40 may be in response to the fax telephone number not being associated with a subscriber of one or more fax services of the fax service provider. In one embodiment, upon receiving the incoming fax transmission at block 31, the fax server may determine whether the fax telephone number is associated with a subscriber (e.g., by using the fax telephone number to perform a table lookup into the subscriber data 25). If the fax telephone number is not associated with a subscriber (and/or is not associated with a subscriber that is currently subscribing to one or more services), the fax server 6 may process with transmitting the request message to the online database. Otherwise, if the fax telephone number is associated with a subscriber, the fax server may proceed with processing and distributing the electronic document to the subscriber according to the subscriber data. For instance, the fax server 6 may transmit the electronic document (e.g., over PSTN and/or over the computer network) to one or more destination addresses associated with the fax telephone number in the subscriber data.

FIG. 5 illustrates a data structure 70 that includes auditing data 26 associated with the processing of the fax transmission, according to some embodiments. Specifically, the data structure includes a table that includes data regarding an incoming fax transmission to the fax server 6. In one aspect, the fax server 6 may audit one or more of the performed operations described herein (e.g., in processes 30 and 40 of FIGS. 3 and 4, respectively). In particular, the server may audit operations by storing auditing data 26 in the structure 70 regarding various operations, such as reception of an incoming fax transmission, and/or transmission of a document. For example, as shown, the table includes receiving data, document processing data, and transmitting data. The receiving data includes information regarding a received incoming fax transmission, which includes a reception time stamp that indicates a time at which the fax transmission was received, sender's (or source) information, such as a phone number or e-mail address of the sender, recipient's information that may include a fax telephone number to which the incoming fax transmission is being sent, and document information that includes information regarding the incoming fax transmission, such as the number of pages, document type, etc. In one embodiment, the server 6 may determine and store the receiving data upon receiving the incoming fax.

The document processing data may include information regarding when and how an incoming fax transmission is processed by the fax server. For example, the processing data may include processing time stamp(s) that indicate when a document is processed, processing information that indicates how the document is processed (e.g., indicating that a first searchable electronic document is converted into a second searchable electronic document and what format the document is converted from and into, etc.), and updated document information (e.g., indicating that the processed document's page size changed from five pages to six pages, etc.). The transmitting data may include information regarding the transmission (or routing) of the fax transmission, which may include a transmission time stamp and destination address(es) to which the fax has been routed. In one embodiment, more or less information may be stored within the data structure.

An embodiment may be an article of manufacture in which a non-transitory machine-readable storage medium has stored thereon instructions which program one or more data processing components (generically referred to here as "a processor") to perform the operations described above. For example, in one embodiment, the above-described processes 30 and/or 40 of FIGS. 3 and 4, respectively may be performed by the processor 21 that is executing instructions stored in the non-transitory machine-readable storage medium. The non-transitory machine-readable storage medium may be a part of the fax server 6, as described herein. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an online fax service provider, the method comprising:

receiving, over a computer network, an electronic document to be routed to a fax telephone number;

transmitting, over the computer network, a request to an online database to determine whether the fax telephone number is registered to not receive incoming fax transmissions over a circuit-switched network;

in response to determining that the fax telephone number is registered, transmitting, over the computer network, the electronic document to a destination address;

in response to determining that the fax telephone number is not registered, place an outgoing call to the fax telephone number; and transmitting the electronic document in a fax format over the outgoing call.

2. The method of claim 1 further comprising, in response to transmitting the request, receiving, over the computer network, a response from the online database that includes the destination address to which the electronic document is to be transmitted.

3. The method of claim 2, wherein the response includes a communication protocol for transmitting the electronic document, wherein transmitting the electronic document to the destination address comprises establishing a communication data connection to the destination address and transmitting the electronic document according to the communication protocol, wherein the communication protocol is one of a group of protocols comprising FTP, FTPS, SFTP, SCP, HTTP, and HTTPS.

4. The method of claim 1, wherein when the destination address is an e-mail address, transmitting the electronic document comprises transmitting an e-mail that includes the electronic document as an attachment to the e-mail address.

5. The method of claim 1, wherein the destination address is a first destination address that is associated with the online database, wherein upon receiving the electronic document the online database becomes configured to route the electronic document to a second destination address.

6. The method of claim 5, wherein the second destination address is unknown to the online fax service provider.

7. The method of claim 1, wherein the online database is owned by an online database service provider and the fax telephone number is owned by an online service provider who purchased the fax telephone number from a telephone company.

8. The method of claim 1, wherein receiving the electronic document comprises receiving an electronic message that includes the electronic document and the fax telephone number.

9. A system comprising:

a processor; and non-transitory machine-readable storage medium having instructions stored therein which when executed by the processor causes the system to receive, over a computer network, an electronic document to be routed to a fax telephone number, transmit, over the computer network, a request to an online database to determine whether the fax telephone number is registered to not receive incoming fax transmissions over a circuit-switched network, in response to determining that the fax telephone number is registered, transmit, over the computer network, the electronic document to a destination address, in response to determining that the fax telephone number is not registered, place an outgoing call to the fax telephone number, and transmit the electronic document in a fax format over the outgoing call.

10. The system of claim 9, wherein the non-transitory machine-readable storage medium has further instructions to, in response to transmitting the request, receive, over the computer network, a response from the online database that includes the destination address to which the electronic document is to be transmitted.

11. The system of claim 10, wherein the response includes a communication protocol for transmitting the electronic document, wherein the instructions to transmit the electronic document to the destination address comprises instructions to establish a communication data connection to the destination address and transmit the electronic document according to the communication protocol, wherein the communication protocol is one of a group of protocols comprising FTP, FTPS, SFTP, SCP, HTTP, and HTTPS.

12. The system of claim 9, wherein when the destination address is an e-mail address, the instructions to transmit the electronic document to the destination address comprises instructions to transmit an-mail that includes the electronic document as an attachment to the e-mail address.

13. The system of claim 9, wherein the destination address is a first destination address that is associated with the online database, wherein upon receiving the electronic document the online database becomes configured to route the electronic document to a second destination address that is unknown to the online fax service provider.

14. The system of claim 9, wherein the online database is owned by a first online service provider and the fax telephone number is owned by a second online service provider who purchased the fax telephone number from a telephone company.

15. The system of claim 9, wherein the instructions to receive the electronic document comprises instructions to receive an electronic message that includes the electronic document and the fax telephone number.

16. A non-transitory machine-readable storage medium having stored therein instructions which when executed by a processor:

receive, over a computer network, an electronic document to be routed to a fax telephone number;

transmit, over the computer network, a request to an online database to determine whether the fax telephone number is registered to not receive incoming fax transmissions over a circuit-switched network;

in response to determining that the fax telephone number is registered, transmit, over the computer network, the electronic document to a destination address;

in response to determining that the fax telephone number is not registered, place an outgoing call to the fax telephone number; and transmit the electronic document in a fax format over the outgoing call.

17. The non-transitory machine-readable storage medium of claim 16 has further instructions to, in response to transmitting the request, receive, over the computer network, a response from the online database that includes the destination address to which the electronic document is to be transmitted.

18. The non-transitory machine-readable storage medium of claim 17, wherein the response includes a communication protocol for transmitting the electronic document, wherein the instructions to transmit the electronic document to the destination address comprises instructions to establish a communication data connection to the destination address and transmit the electronic document according to the communication protocol, wherein the communication protocol is one of a group of protocols comprising FTP, FTPS, SFTP, SCP, HTTP, and HTTPS.

19. The non-transitory machine-readable storage medium 16, wherein the destination address is a first destination address that is associated with the online database, wherein upon receiving the electronic document the online database becomes configured to route the electronic document to a second destination address that is unknown to the online fax service provider.

20. The non-transitory machine-readable storage medium of claim 16, wherein the online database is owned by a first online service provider and the fax telephone number is owned by a second online service provider who purchased the fax telephone number from a telephone company.

* * * * *